(12) United States Patent
Nichols (10) Patent No.: US 7,152,335 B2
(45) Date of Patent: Dec. 26, 2006

(54) OMNIDIRECTIONAL TORPEDO LEVEL HAVING MAGNETIC MOUNTS AND ADJUSTABLE PROTRACTOR

(76) Inventor: Michael P. Nichols, P.O. Box 1546, Dickinson, TX (US) 77539

( * ) Notice: Subject to any disclaimer, the term of this patent is extended or adjusted under 35 U.S.C. 154(b) by 0 days.

(21) Appl. No.: 11/073,210

(22) Filed: Mar. 5, 2005

(65) Prior Publication Data
US 2006/0196061 A1  Sep. 7, 2006

(51) Int. Cl.
*G01C 9/36* (2006.01)

(52) U.S. Cl. .................. 33/390; 33/DIG. 1; 33/389

(58) Field of Classification Search .......... 33/374–390, 33/DIG. 1
See application file for complete search history.

(56) References Cited

U.S. PATENT DOCUMENTS

| | | | | |
|---|---|---|---|---|
| 3,832,782 A | * | 9/1974 | Johnson et al. | 33/451 |
| 5,421,094 A | * | 6/1995 | McCord et al. | 33/373 |
| 5,685,083 A | * | 11/1997 | Decesare | 33/390 |
| 5,749,152 A | * | 5/1998 | Goss et al. | 33/381 |
| D415,436 S | * | 10/1999 | Martone | D10/69 |
| 6,782,628 B1 | * | 8/2004 | Liao | 33/384 |

* cited by examiner

*Primary Examiner*—Yaritza Guadalupe-McCall
(74) *Attorney, Agent, or Firm*—James L. Jackson (57) ABSTRACT

An omnidirectional torpedo level composed of non-ferrous material has a central web and parallel side flanges defining a torpedo level geometry. The central web and side flanges define windows within which are mounted vertical and horizontal tubular spirit level elements that permit selective orientation of the side flanges to determine when surfaces being engaged by the side flanges are either vertically or horizontally oriented. A rotary protractor is mounted to the central web and contains a spirit level tube for accurate positioning of the side flanges with respect to the selected angle of the protractor. Magnet members are mounted to one or both of the side flanges and serve to support the level device in hands-off relation when in contact with ferrous metal objects. A circular omnidirectional level enlargement is provided at the upper end portion of the level body and provides for support of a circular omnidirectional level device having a circular lens marked with circular positioning indicia. Liquid and air within the circular omnidirectional level device form an orientation bubble which is aligned with the circular indicia to confirm vertical alignment of the reference surfaces with respect to "x" and "y" axes.

19 Claims, 4 Drawing Sheets

OMNIDIRECTIONAL TORPEDO LEVEL HAVING MAGNETIC MOUNTS AND ADJUSTABLE PROTRACTOR

BACKGROUND OF THE INVENTION

1. Field of the Invention

The present invention generally concerns torpedo levels, which are ordinarily provided with spirit tubes or capsules that permit use of the level to confirm vertical or horizontal orientation of the surfaces or edges of objects. More specifically, the present invention concerns a torpedo level having an adjustable spirit level protractor to permit selection of desired angles other than horizontal and vertical. Even more specifically the present invention concerns a torpedo level having an omnidirectional level capability and magnetic retention on ferrous metal objects, permitting a user to accomplish hands-free positioning of the object.

2. Description of the Prior Art

Torpedo levels are typically small and lightweight handheld level devices that typically have pointed or rounded ends, enabling them to be easily inserted into carried in a pocket of a users clothing or tool apron. Torpedo levels are well known in the art of construction and typically have a relatively short level body, from 8" to 12" in length, within which is mounted slightly curved transparent spirit level tubes or capsules of circular cross-section that have level indicating indicia. The spirit level tubes are typically used for verification of the orientation of objects engaged by the level body and are visually inspected to determine the orientation of surfaces relative to the horizontal and, vertical or relative to an intermediate angle, such as 45°. Torpedo levels are typically are provided with spirit or bubble tubes containing a fluid medium and air to develop an internal bubble. The spirit or bubble tubes are marked with indicia with which a bubble within a selected spirit tube is oriented to confirm the orientation of a surface or edge that is engaged by a straight edge of the level body.

SUMMARY OF THE INVENTION

It is a principal feature of the present invention to provide a novel torpedo level having spirit tubes for determining level orientation of surfaces or edges of objects and having an omnidirectional vertical level capability permitting multi-axis level determination of a surface or edge without necessitating multiple selective orientation of the level on an object;

It is another feature of the present invention to provide a novel torpedo level having an omnidirectional vertical level positioned to be visually inspected by a user, with the level in contact with a surface or edge of an object and permitting vertical orientation of the surface or edge by movement of the object, without necessitating multiple selective orientation of the level on the object;

It is also a feature of the present invention to provide a novel torpedo level with parallel side surfaces for engagement with a surface or edge of an object and having opposed ends and an omnidirectional vertical level located at one of the ends;

It is another feature of the present invention to provide a novel torpedo level having at least one magnet for temporary hands-free retention of the torpedo level on a ferrous metal object and having an omnidirectional vertical level that is indicates visual alignment of a surface or edge with respect to the vertical;

It is a feature of the present invention to provide a novel omnidirectional torpedo level having an enlargement at the upper end thereof which defines a mount for an opmidirectional level cartridge and does not extend beyond a plane defined by side surfaces of the level body, thus ensuring that the omnidirectional mount enlargement does not interfere with face-to-face engagement of the level body with a flat surface of a post or other object.

Briefly, the various objects and features of the present invention are realized through the provision of a torpedo level body having a central web and parallel side flanges, the side flanges being tapered at the upper and lower ends thereof to define a torpedo level geometry. The central web defines at least one inspection window within which are mounted one or more vertical and/or horizontal tubular spirit level elements. An intermediate side portion of the torpedo level body may be cut-away or otherwise formed to define an inspection opening or window within which is mounted a spirit level capsule. The inspection opening permits the intermediate spirit level to be viewed from the side, front and back of the level body structure. The vertical and horizontal tubular spirit level elements permit selective orientation of the side flanges of the body structure so that the level can be employed to determine when surfaces being engaged by the side flanges are either vertically or horizontally oriented or can be employed for adjustment of the position of the surfaces to vertical or horizontal.

A rotary protractor is also mounted to the central web and can be selectively manually adjusted to any suitable angle. The protractor also contains a spirit level tube having position indicating indicia and having air and a fluid within the tube to provide a spirit bubble that can be oriented with respect to the indicia for accurate positioning of the flanges with respect to the selected angle of the protractor. A position retention system is provided to ensure against free rotation of the rotatable protractor but permitting manual rotation of the protractor when it is desired to move the spirit level tube to a different rotary orientation.

At its upper end portion the torpedo level body structure defines a generally annular enlargement that is preferably of generally conical configuration, with its largest dimension facing upwardly. The generally annular enlargement defines a capsule receptacle within which is mounted an omnidirectional level capsule. Typically the omnidirectional level capsule is of circular configuration, though it may have any other desirable shape, and includes a lens having a partially spherical configuration. A fluid and air within the capsule develops an internal circular level indicating bubble that is coincident with circular indicia on the lens when the capsule is oriented vertically. To enable a side surface of the level body to be positioned in position referring relation with a planar surface of an object such as a post, the generally annular enlargement is off-set with respect to the center-line of the level body such that a vertical center-line of the generally annular enlargement is disposed in spaced and parallel relation with the center-line of the level body.

Magnet members are mounted to one or both of the side flanges and serve to support the omnidirectional torpedo level in hands-off relation when the level is placed in contact with objects composed of ferrous metal. The non-ferrous material from which the body structure is composed ensures that the body structure does not interfere with the function of the support magnets.

The omnidirectional level capsule mount is preferably of substantially circular configuration and is located at the upper end portion of the central web and provides for support of a circular omnidirectional level capsule. The circular capsule includes a circular lens having circular positioning indicia located centrally thereof. Liquid and air within the circular omnidirectional level capsule defines an orientation bubble which is aligned with the circular indicia to confirm alignment of the surface being engage with respect to "x" and "y" axes. The circular omnidirectional level capsule mount is of relatively large diameter for efficiency of viewing and is laterally off-set with respect to the longitudinal center-line of the central web so that an outer edge surface of the capsule mount does not project beyond a plane that is coincident with one side edge of the parallel edge flanges of the level body structure. This feature permits edges of the parallel side flanges to be positioned in engagement with a planar surface of an object and yet permits the upwardly facing omnidirectional level capsule at the upper end of the level body to be readily inspected so that vertical positioning of the object may be easily accomplished. And if the post or other object is composed of a ferrous metal, the magnets of the torpedo level permit the level body to be releasably adhered to the object so that the position of the object may be adjusted, hands-free, without any necessity to manually hold the level device in place on the object.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings.

DETAILED DESCRIPTION OF PREFERRED EMBODIMENT

Figure 1:
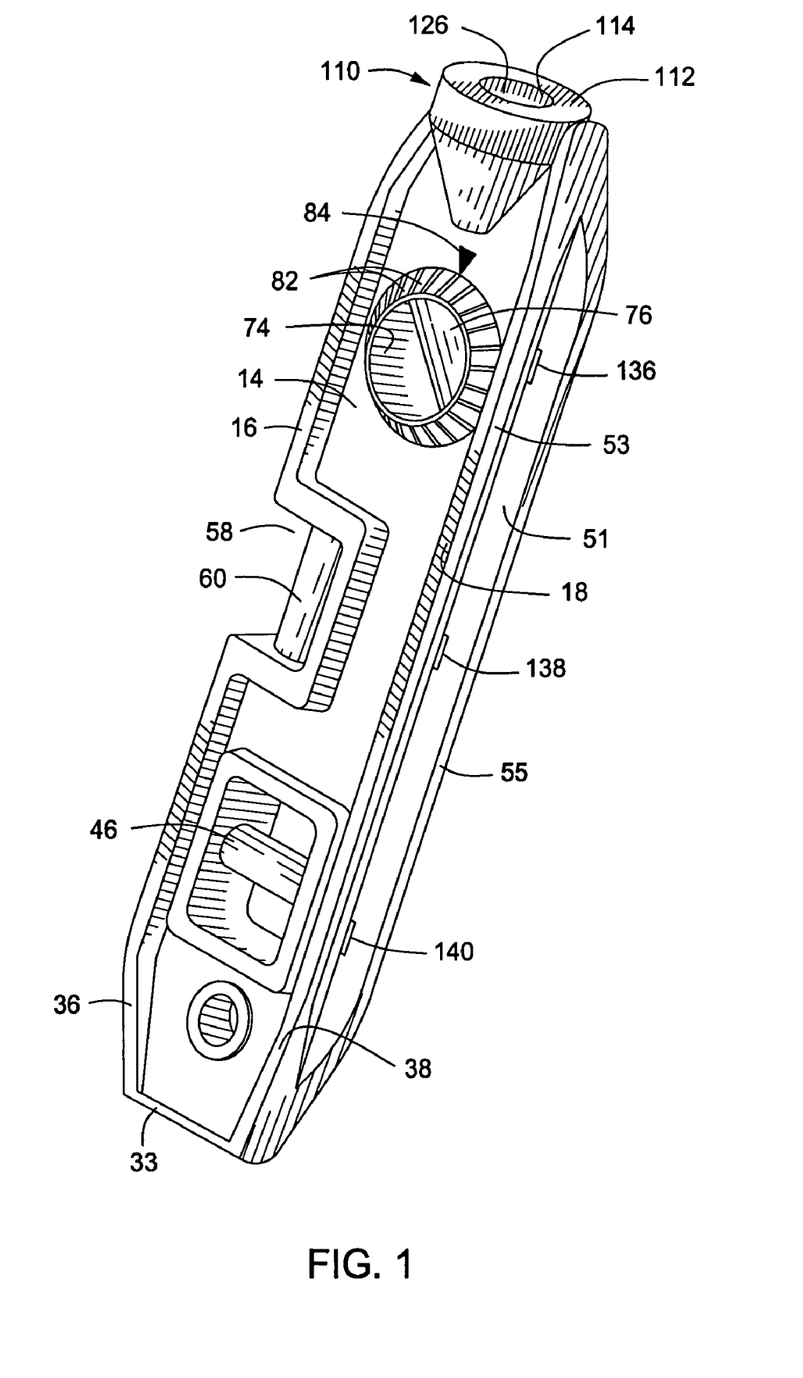
FIG. 1 is an isometric illustration of an omnidirectional torpedo level embodying the principles of the present invention.
Figure 2:
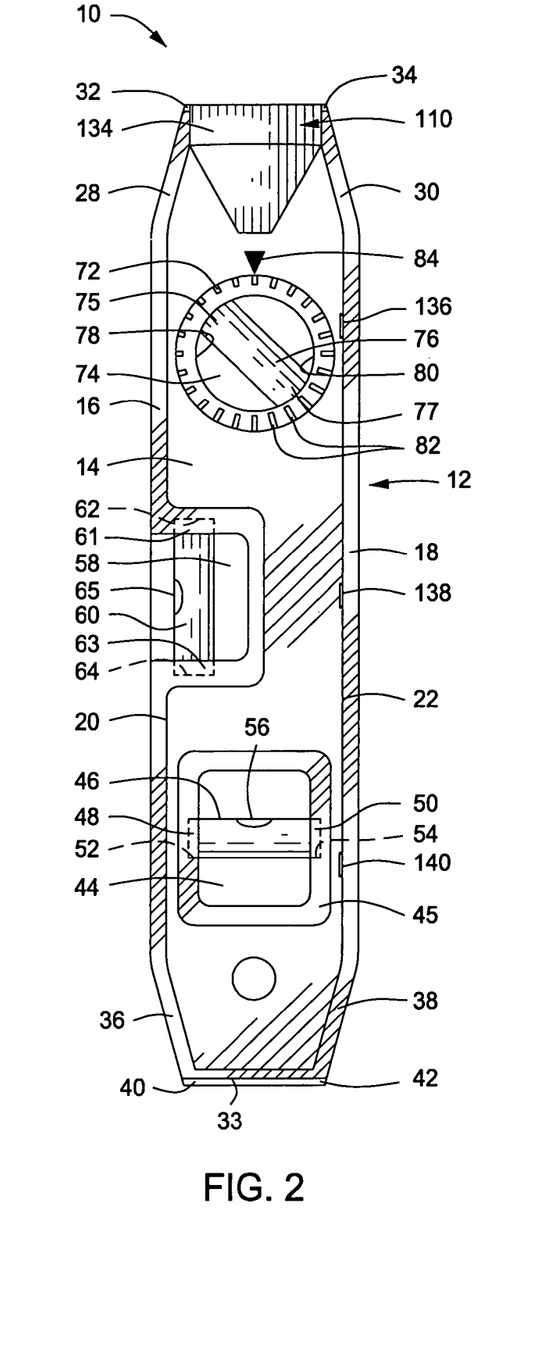
FIG. 2 is a front elevational view of the omnidirectional torpedo level of FIG. 1.
Figure 3:
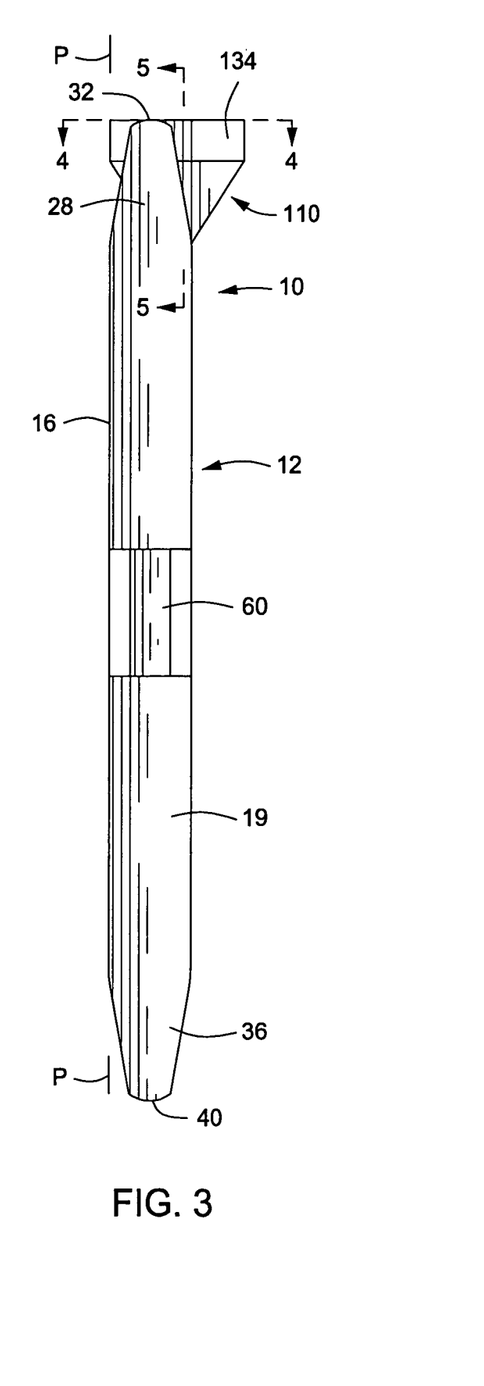
FIG. 3 is a side elevational view of the omnidirectional torpedo level of FIGS. 1 and 2.

Referring now to the drawings and first to FIGS. 1–3, an omnidirectional torpedo level embodying the principles of the present invention is shown generally at 10 and comprises a torpedo level body shown generally at 12 composed of a non-ferrous material such as any one of a number of suitable polymers or a non-ferrous metal, such as aluminum alloy, brass, stainless steel or the like. The torpedo level body 12 has a generally planar central web 14 of suitable thickness to provide the body structure 12 with sufficient structural integrity to withstand the typically rugged use of the construction industry. A pair of side flanges 16 and 18 are fixed to opposed side edges 20 and 22 of the central web 14 and are preferably disposed in substantially parallel relation with one another and also preferably disposed in substantially parallel relation with the longitudinal center-line C/L of the generally planar central web 14.

The side flanges 14 and 16 each define rear planar reference surfaces 15 and 17 that are co-planar and are located coincident with an imaginary reference plane P. The side flanges 14 and 16 each also define planar side reference surfaces 19 and 21 that are disposed in parallel relation and are located perpendicular relation with the imaginary reference plane P. To provide the level with a reasonably conventional torpedo shape, the side flanges 16 and 18 are each tapered at respective upper and lower ends thereof by providing on the side flanges upwardly converging flange edges 28 and 30 that merge at upper rounded ends 32 and 34 and downwardly converging flange edges 36 and 38 that merge at lower rounded ends 40 and 42. The lower rounded ends 40 and 42 of the downwardly converging flange edges 36 and 38 are substantially coincident with a lower end flange 33 that defines a blunt lower end of the level device. The side flanges 16 and 18 may be fixed to the respective edges of the central web 14 in any suitable manner or may be formed integrally with the central web such as by molding or by extrusion. For example, when the body structure of the omnidirectional torpedo level is manufactured, it may be formed from extruded metal stock, assuming that its omnidirectional level capsule, to be discussed in detail below, is not integral with the central web. The body structure may be molded of metal or plastic, hard rubber or other suitable material when its omnidirectional level capsule is intended to be integral with the central web of the body structure as will be explained in detail below.

The central web 14 is intended to provide support for a number of spirit level capsule elements to permit the user to measure the lever of vertical or horizontal members or to orient members that are intended to be located at an angle of 90° from the vertical or horizontal. If desired, one of the spirit levels may be oriented with respect to the central web to provide a reference angle of 45° with respect to the horizontal or vertical. The central web 14 is also intended to provide moveable support for a protractor level which enables the user to position structural members at any desired angle or to measure the exact angle of a member being engaged by the level. Accordingly, the central web 14 defines a lower level mount and inspection window 44 having a mount frame structure 45 that is preferably integral with the central web 14. With the level body positioned vertically as shown in FIGS. 2 and 3 a horizontally oriented spirit level capsule 46 is mounted within the located within the lower level mount and inspection window 44 by end portions 48 and 50 of the spirit level capsule that are engaged within mounting receptacles 52 and 54 of the central web 14 as shown in broken line. The horizontal spirit level 46 is oriented such that its spirit bubble 56 is centered with respect to the longitudinal center-line C/L and/or with level indicating indicia of the capsule, when either of the parallel side flanges 16 and 18 is oriented in engagement with a vertically oriented surface. In the alternative, with either of the side flanges in engagement with a generally vertically oriented surface or the curved outer surface of a cylindrical object such as a pipe or post, the object defining that surface may be moved until the spirit bubble 56 becomes centered with respect to spirit capsule indicia, thus confirming vertical positioning of that surface. As shown in FIG. 1, one or both of the side flanges may define an external longitudinal groove 51, thus defining spaced longitudinal rails 53 and 55 for engagement with a member, such as a pipe or post, having a curved external surface. The external longitudinal groove and its spaced parallel longitudinal rails permit the level body 12 to be efficiently and accurately oriented by the curved external surface of the member being engaged.

For measuring the level of horizontal surfaces or for orienting surfaces of objects horizontally, an intermediate portion of side flanges and a portion of the central web 14 is formed to define an intermediate level mount and inspection recess or window 58 of generally rectangular configuration. A slightly curved tubular spirit level capsule 60 for horizontal level measurement or for positioning the surfaces of objects horizontally is located within the intermediate inspection window or recess 58. As shown particularly in FIG. 2, ends 61 and 63 of the spirit level capsule 60 are supported within mounting receptacles 62 and 64. The spirit level capsule 60 is provided with level indicating indicia to which its spirit bubble 65 is aligned to indicate that a surface of an object being engaged by the planar surface of the side flange 18 is oriented horizontally. Obviously, the spirit level bubble 56 will be centered within its tubular capsule only when the side flanges 16 and 18 are positioned horizontally. The intermediate generally rectangular inspection window or recess 58 permit visual inspection of the spirit level capsule 60 from the front, rear and sides of the level body structure.

To permit the use of the torpedo level for selective angular orientation of surfaces or for measurement of the precise angle of surfaces engaged by either of the side flanges 16 and 18 of the level, the central web 14 is provided with a circular protractor level capsule mount receptacle 72 which provides rotary support for a circular rotatable protractor element 74. The circular protractor element 74 is provided with a tubular protractor spirit capsule 76 which is supported at its respective ends 75 and 77 by capsule mount receptacles 78 and 80. The circular protractor element 74 is provided with a circular array of indicia 82 so that the position of the protractor may be accurately adjusted to any suitable angle with respect to the planar surfaces of the side flanges 16 and 18. At least one orientation arrow 84 is defined on or by the central web 14 and is positioned with its lowermost point located coincident with the longitudinal center-line C/L. Other reference marks or indicia may also be provided on the central web or side flanges and may be oriented at 90° or 180° or any other desired angular spacing with respect to the orientation arrow 84. This features permits a desired angle to be dialed in, simply by rotary positioning of the rotatable protractor element 74. Then, when the spirit bubble of the protractor spirit capsule 76 is centered, a surface being engaged by one of the side flanges will be oriented at the selected angle of the rotatable protractor element 74.

Figure 6:
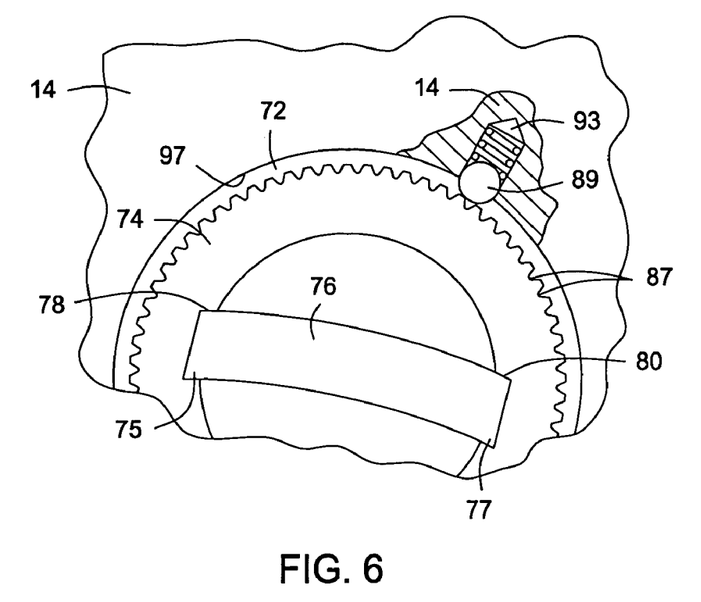
FIG. 6 is a fragmentary sectional view illustrating maintentance of a pre-set rotatable cartridge position by a spring urged ball detent that engages within spaced peripheral edge slots of the rotatable level cartridge of the protractor assembly and permitting manual rotary adjustment of the position of the cartridge.

The rotatable protractor element or its protractor mount may be provided with incremental rotational adjustment with click stops such that each click or each reference line represents a known increment of rotary movement of the protractor element. This feature is particularly important when the available light may be poor. A worker will simply rotate the protractor element a desired number of clicks to position the spirit level cartridge 76 at a desired angle. To accomplish this feature, as shown in the fragmentary sectional view of FIG. 6, the rotatable protractor element may define 360 or any other desired number of evenly spaced external positioning grooves 87 about its periphery and a spring-urged groove engaging detent element 89 supported within a detent receptacle 93 the level body structure will releasably engage within a groove to restrain the rotatable protractor element at any position thereof. Preferably the spring loaded detent is in the form of a ball type detent, but it may also take the form of a spring urged plunger having a blade type groove engaging member. It is only necessary that the detent be of a type that will permit the protractor element to by rotated when a predetermined manual force is applied. To change the position of the rotatable protractor element the worker will simply apply sufficient manual force to the rotatable protractor element to release the spring-like groove engaging detent element from a positioning groove and rotate it a desired number of grooves or clicks to a desired angular position that is defined by another of the peripheral positioning grooves. Each click of rotational movement may represent 1°, 5° or any other selected increment of rotational movement of the protractor element.

Figure 7:
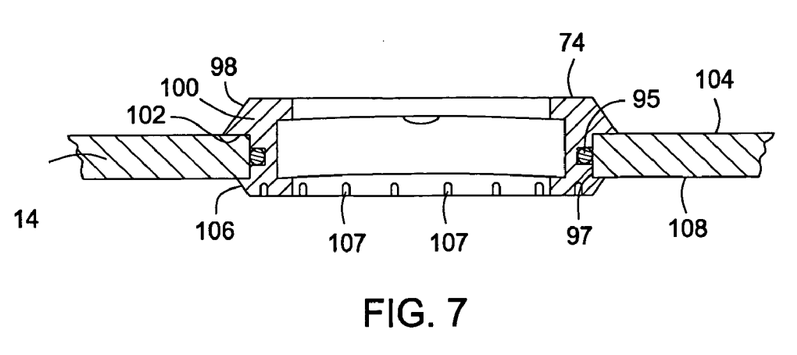
FIG. 7 is a fragmentary sectional view of an alternative embodiment showing simple frictional retention of any pre-set position of the rotatable level cartridge of the protractor assembly.

Alternatively, as shown in FIG. 7, the rotatable protractor element 74 may be provided with the capability for frictional retention within its circular receptacle thus permitting a worker to simply apply sufficient manual force to overcome its frictional resistance to movement and rotate the protractor element to a desired position where it will remain frictionally restrained; until subsequently rotated to another desired position. In this case, as shown in FIG. 7, the frictional resistance is provided by a resilient O-ring member 95 that is retained within an annular outer peripheral O-ring groove of the circular rotatable protractor 74. To provide the desired frictional resistance to rotation the resilient O-ring is disposed in frictional engagement with a circular internal surface 97 of the planar web 14 which defines the circular capsule receptacle 72 within which the circular rotatable level capsule 74 is located. This frictional engagement prevents the circular rotatable level capsule 74 from freely rotating and thus causes the capsule to be maintained at a desired position until such time is it is subsequently manually rotated to change the position of the level capsule.

As is evident from the fragmentary sectional view of FIG. 7 the circular rotatable protractor element 74 defines a circular, angulated edge surface 98 that is marked with indicia identifying the orientation of the rotatable capsule with respect to the central web 14. The angulated edge surface 98 is provided on an annular retainer flange 100 that defines an annular retainer surface 102 positioned in overlying relation with a portion of the planar surface 104 of the central web 14. Another annular retainer member 106 is fixed to or defined by the circular rotatable protractor 74 and is positioned in overlying relation with the opposite planar surface 108 of the central web 14 and serves to retain the rotatable capsule within its circular receptacle. For ease of assembly of the circular rotatable protractor 74 within the receptacle of the central web 14, the circular retainer member 106 may be slotted or otherwise flexible as shown at 107, thus permitting the circular retainer member to be manually forced through the circular receptacle opening during its assembly with the central web 14 of the level body 12. The annular retainer flange 100 may also be flexible, due to the polymer material from which it is typically composed, so that it can be yielded by application of manual force to permit the circular protractor 74 to be moved sufficiently into the circular receptacle that is defined by the circular internal surface 97 to move the circular retainer flange member 106 past the planar surface 108 of the web 14 to permit it to assume its retaining position. When the slotted portion of the annular retainer member 106 is moved clear of the internal circular surface 97 and past the planar surface 108 it will return to the retaining position shown in FIG. 7 due to the elastic memory of the material, typically a polymer, from which it is composed. Thus, during assembly the rotatable protractor can be simply pressed into place by application of manual force.

As mentioned above, it is also desirable to provide a torpedo level having the capability of achieving omnidirectional orientation with respect to a spirit level bubble to thus achieve vertical positioning of an object, such as a post, vertical structural member or the like simply by moving the object with respect to its "x" and "y" axes so as to orient the surface and thus the centerline of the object vertically with respect to a point about which the centerline or surface of the object is moveable. When a post is being vertically positioned, its point of movement will be represented by a pivot end of a line that is parallel with the surface being engaged by a side flange of the omnidirectional level device. For example the pivot point will typically be roughly defined by intersection of an outside surface of the post with the ground. To ensure accurate vertical positioning of the post, the post must be accurately adjusted with respect to its "x" and "y" axes.

Figure 4:
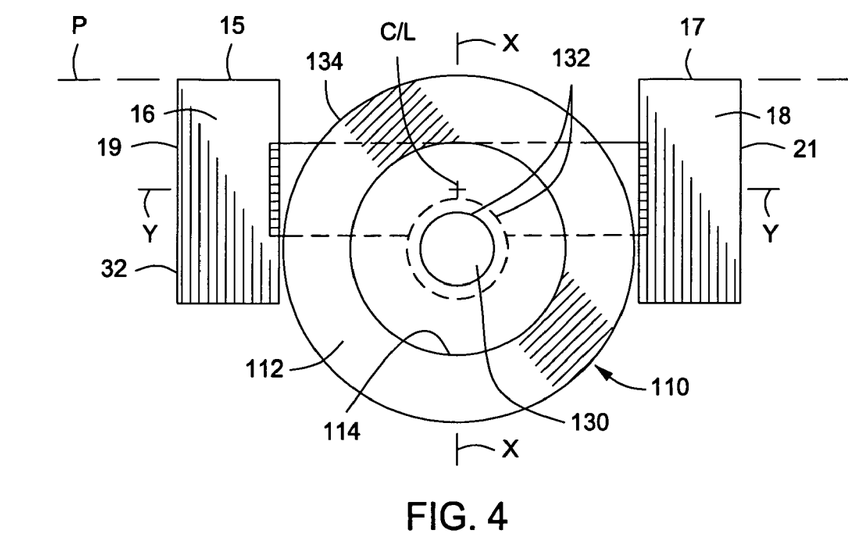
FIG. 4 is a plan view showing the upper portion of the omnidirectional torpedo level of FIGS. 1–3, the view being taken along line 4—4 of FIG. 3.
Figure 5:
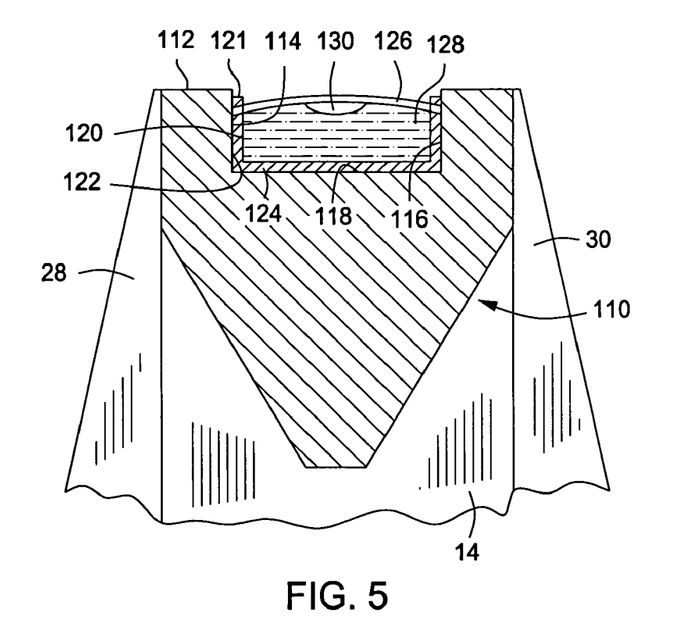
FIG. 5 is a sectional view being taken along line 5—5 of FIG. 3 and showing an omnidirectional level capsule being seated within a capsule receptacle at the upper end of the torpedo level.

At the upper end the torpedo level body 12 and at the upper substantially straight end portion of the central web 14 an omnidirectional level mount enlargement 110 which is shown to be of generally conical configuration, but which may be of any other suitable configuration without departing from the spirit and scope of the present invention. The enlargement is preferably formed integrally with the central web 14 or is fixed to the central web, depending on the manner by which the level body structure is manufactured. For example, the level body can be formed in two body halves that are bonded together or are retained in assembly by screws or any other suitable fastener devices. The fixed vertical and horizontal spirit level capsules may be retained in place as they are located within capsule receptacles and the body halves are assembled. The generally conical enlargement 110 defines an upper, planar surface 112 that is preferably located at a plane that is also intersected by the upper curved ends of the upper, tapered portions 28 and 30 of the side flanges 16 and 18. Centrally of the upper planar surface 112 the generally conical enlargement 110 defines a circular level capsule receptacle 114 having a generally cylindrical side wall surface 116 and a planar bottom surface 118. The generally conical external surface prevents the omnidirectional level mount enlargement from It should be borne in mind that the level capsule receptacle and capsule mount enlargement may be of any other suitable configuration without departing from the spirit and scope of the present invention.

According to the preferred embodiment of the present invention an omnidirectional spirit level capsule 120 having a generally cylindrical side wall 122 and a planar bottom wall 124 is seated within the circular level capsule receptacle 114 such that it is fixed in place. The capsule 120 is closed at its upper portion by a circular transparent lens 126 that is of partially spherical configuration. The lens is sealed to the upper portion of the circular side wall 122 and, together with the side wall 122 and bottom wall 124 defines a closed fluid chamber 128 within which a fluid is contained. The capsule 120 may be secured in place by an annular retainer element 121 that is secured within the upper portion of the level capsule receptacle 114 and establishes retaining engagement with the outer peripheral portion of the circular lens 126. A small quantity of air, also present within the fluid chamber 128 defines a level indicating bubble 130 in the fluid. The lens is provided with circular indicia which is positioned centrally thereof. The dimension of the spirit bubble 130 is preferably substantially the same as the circular dimension of the circular indicia 132, thus promoting ease of precision orientation of the spirit bubble with respect to the circular indicia to achieve precise vertical orientation of the longitudinal center-line C/L and the object that is engaged by one or both of the rear reference surfaces 15 and 17 of the side flanges 16 and 18 or one of the side reference surfaces 19 and 21. When the circular spirit bubble 94 is oriented in centered relation with respect to the circular indicia, the longitudinal center-line C/L of the central web will be oriented vertically with respect to both the "x" and "y" axes. Thus, the post or other object being engaged by one of the flanges 16 and 18 will also be vertically aligned with respect to both the "x" and "y" axes. When the omnidirectional level capsule is oriented precisely vertically, the level indicating bubble, being of circular configuration, will be in registry with the circular indicia 132, thus indicating that the object being engaged by reference surfaces of the level body is vertical with respect to the "x" and "y" axes thereof. If desired, the upper surface of the lens 126 may be of planar or convex configuration; however the lower surface of the lens is of curved or partially spherical configuration so that the air bubble can achieve centered location when the center-line C/L is oriented vertically.

Alternatively, an omnidirectional level capsule may not be positioned within the capsule receptacle 114. In this case, the side wall 116 and the bottom wall will define a fluid chamber within which liquid and a small quantity of air will be located. The outer peripheral portion of the transparent lens 126 will be seated on an annular internal shoulder within the receptacle and will be secured in place by the annular retainer element such as that shown at 121. Accordingly, it should be borne in mind that the configuration and structure of the generally conical shaped omnidirectional level mount enlargement 110 is intended only to be representative of one of the possible embodiments of the present invention and is not intended to be limiting of the spirit and scope of the invention. The generally conical shaped omnidirectional level mount enlargement 110 is intended only to provide an upwardly facing omnidirectional level on the body portion of a torpedo level. The omnidirectional level mount may be located at any desired position along the length of the level body as it deemed to be suitable to the needs of the manufacturer or user.

Assuming the upper portion of the generally conical shaped omnidirectional level mount enlargement 110 is of circular configuration as shown its configuration may define an upper circular outer peripheral surface 134. This circular outer peripheral surface may be located in tangential relation with the imaginary reference plane P but it must not project beyond the reference plane; otherwise the circular outer peripheral surface will interfere with reference contact of the rear reference surfaces 15 and 17 of the side flanges 16 and 18. If the omnidirectional level mount enlargement 110 is of any other configuration no portion of it projects beyond the imaginary reference plane. The omnidirectional level mount enlargement may be formed integrally with the level body or with body halves when the body structure is defined by joined body sections. The omnidirectional level mount enlargement may be a separate element that is fixed in any suitable manner to the body structure of the omnidirectional level device.

The omnidirectional torpedo level of the present invention is designed to be especially useful for achieving omnidirectional orientation of ferrous metal objects such as ferrous metal posts or pipes. To permit "hands-off" omnidirectional adjustment of pipes, one or both of the side flanges 16 and 18 are provided with support magnets 136. 138 and 140 that are fixed within magnet receptacles or windows of the side flanges 16 and/or 18. The magnetic attraction of the magnets are sufficient to support the weight of the omnidirectional torpedo level so that an object on which the level is supported can be adjusted as to the "x" and "y" axes thereof without any need to manually hold the level in proper oriented contact with the object while the object is being adjusted. Since the body structure 12 is composed of non-ferrous material, the material from which the body is composed will not prevent the supporting function of the magnets when ferrous metal objects are being aligned.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. An omnidirectional torpedo level comprising:
    a torpedo level body having a longitudinal axis and defining upper and lower ends and defining a reference plane being disposed in substantially parallel relation with said longitudinal axis;
    an omnidirectional level mount being integral with and forming a portion of said body member and being oriented so that no part thereof projects beyond said at least one reference plane, said omnidirectional level mount defining a level capsule receptacle;
    an omnidirectional level capsule being located within said level capsule receptacle of said omnidirectional level mount and having an upwardly facing transparent lens of partially spherical configuration defining circular orientation reference indicia centrally thereof; and
    a liquid and a gas within said omnidirectional level capsule defining a level orientation bubble positioned in aligned registry with said circular orientation reference indicia to confirm vertical orientation of said longitudinal axis and said reference plane with respect to "x" and "y" axes.

2. The omnidirectional torpedo level of claim 1, comprising:
    said omnidirectional level mount being an enlargement integral with said torpedo level body and defining an upwardly facing level surface and defining said level capsule receptacle; and
    said transparent lens to orient said omnidirectional reference indicia in substantially normal relation with said longitudinal axis.

3. The omnidirectional torpedo level of claim 1, comprising:
    said torpedo level body defining upper and lower ends; and
    said omnidirectional level mount being an enlargement integral with said torpedo level body and having an upper surface disposed in substantially normal relation with said longitudinal axis, said level capsule receptacle intersecting said upper surface.

4. The omnidirectional torpedo level of claim 1, comprising:
    level inspection openings being defined by said torpedo level body and having spirit level tube mounts; and
    a spirit level tube being located within each of said inspection openings and having end portions thereof supported by said spirit level tube mounts, said spirit level tubes each being oriented for level indication of specific angles of level positioning.

5. The omnidirectional torpedo level of claim 4, comprising:
    said circular orientation indicia having substantially the same dimension as the dimension of said spirit bubble.

6. The omnidirectional torpedo level of claim 1, comprising:
    side flanges being defined by said torpedo level body and having side flange surfaces being disposed in substantially parallel and co-planar relation, two of said side flange surfaces defining said reference plane;
    at least one spirit level tube being mounted within said torpedo level body; and
    at least one inspection opening being defined intermediate said level body and interrupting at least one of said side flanges and permitting visual inspection of said at least one spirit level tubes.

7. The omnidirectional torpedo level of claim 1, comprising:
    said torpedo level body having side flanges and a central web being integral with said side flanges;
    a protractor mount being defined by said central web;
    a protractor member being rotatably supported by said protractor mount and being rotatably adjustable; and
    a spirit level tube being mounted within said protractor member and having a liquid and a gas therein defining a level orientation bubble, said spirit level tube having level indicating indicia thereon, said level orientation bubble being disposed in registry with said level indicating indicia when a reference portion of said torpedo level body is oriented in alignment with a selected angle of said protractor capsule.

8. The omnidirectional torpedo level of claim 1, comprising:
    said omnidirectional level capsule being of substantially circular configuration;
    said lens having a concave internal surface; and
    said orientation indicia being of substantially circular configuration and having the center thereof substantially parallel with said longitudinal center-line of said torpedo level body.

9. The omnidirectional torpedo level of claim 1, comprising:
- said torpedo level body having side flanges and having a central web integral with said side flanges;
- vertical and horizontal windows being defined by said central web and having spirit level tube mounts;
- a spirit level tube capsule being located within each of said vertical and horizontal windows and having end portions thereof supported by said spirit level tube mounts;
- at least one of said side flanges having an inspection window therein permitting visual inspection of at least one of said spirit level tube capsules;
- a protractor mount being located in said central web;
- a protractor capsule being rotatably supported by said protractor mount and being rotatably adjustable; and
- a spirit level tube being supported within said protractor capsule and having a liquid and a gas therein defining a spirit bubble, said spirit level tube having level indicating indicia thereon, said spirit bubble being disposed in registry with said level indicating indicia when a reference portion of said torpedo level body is disposed in alignment with a selected angle of said protractor capsule.

10. The omnidirectional torpedo level of claim 1, comprising:
- said torpedo level body having side flanges and having a central web integral with said side flanges;
- said omnidirectional level capsule being of substantially circular configuration;
- said lens having a concave internal surface;
- said orientation indicia being of circular configuration and having the center thereof substantially coincident with said center-line of said torpedo level body;
- said circular orientation indicia having substantially the same dimension as the dimension of said spirit bubble;
- vertical and horizontal windows being defined by said central web and having spirit level tube mounts;
- a spirit level tube capsule being located within each of said vertical and horizontal windows and having end portions thereof supported by said spirit level tube mounts;
- at least one of said side flanges having an inspection window therein permitting visual inspection of at least one of said spirit level tube capsules;
- a protractor mount being provided by said central web;
- a protractor capsule being rotatably supported by said protractor mount and being rotatably adjustable; and
- a spirit level tube being supported within said protractor capsule and having a liquid therein defining a spirit bubble, said spirit level tube having level indicating indicia thereon, said spirit bubble being disposed in registry with said indicia when a reference portion of said torpedo level body is disposed in alignment with a selected angle of said protractor capsule.

11. The omnidirectional torpedo level of claim 1, comprising:
- said torpedo level body defining upper and lower ends and having a central web and side flanges being integral with said central web;
- said omnidirectional level mount being of generally conical configuration and being integral with said central web and located at said upper end of said level body and defining an upwardly facing circular receptacle; and
- said omnidirectional level capsule being located within said upwardly facing circular receptacle and being of generally cylindrical configuration and positioning said upwardly facing transparent lens within said circular receptacle.

12. The omnidirectional torpedo level of claim 11, comprising:
- said upwardly facing level receptacle of said omnidirectional level mount being located substantially coincident with said upper end of said torpedo level body; and
- said omnidirectional level mount having a substantially annular upper surface having one side thereof disposed in substantially tangential relation with said reference plane.

13. An omnidirectional torpedo level comprising:
- a torpedo level body having a longitudinal body axis and defining upper and lower ends and having at least one alignment surface being disposed in substantially parallel relation with said longitudinal axis, said torpedo level body having reference surface portions defining an imaginary reference plane;
- an omnidirectional level mount enlargement being integral with said torpedo level body and defining an upwardly facing circular level receptacle having a receptacle opening, said omnidirectional level mount enlargement having a longitudinal mount axis disposed in substantially parallel relation with said longitudinal body axis and being located on one side of said imaginary reference plane, said omnidirectional level mount enlargement defining an upwardly facing portion located on said one side of said imaginary reference plane;
- a generally circular lens being located within said receptacle opening and having a concave inner surface and defining orientation indicia substantially centrally thereof; and
- a liquid and a gas being located within said upwardly facing circular level receptacle and being in contact with said concave inner surface and defining a level orientation bubble being positioned in aligned registry with said orientation indicia to confirm vertical orientation of said longitudinal mount axis, said imaginary reference plane and said at least one alignment surface.

14. The omnidirectional torpedo level of claim 13, comprising:
- an omnidirectional level capsule being located within said upwardly facing circular level receptacle and defining an annular side wall and a bottom wall;
- said generally circular lens being sealed to said annular side wall.

15. The omnidirectional torpedo level of claim 14, comprising:
- said omnidirectional level capsule being of generally cylindrical configuration and being seated within said omnidirectional level enlargement and positioning said transparent lens within said receptacle opening.

16. The omnidirectional torpedo level of claim 15, comprising:
- said torpedo level body having a central web and having side flanges integral with said central web, said side flanges defining at least a part of said reference surface portions;
- said omnidirectional level capsule being of substantially circular configuration;
- said lens having a concave internal surface;
- said orientation indicia being of circular configuration and having the center thereof substantially coincident with said longitudinal mount axis;

said circular orientation indicia having substantially the same dimension as the dimension of said spirit bubble;

vertical and horizontal windows being defined by said central web and having spirit level tube mounts;

a spirit level tube capsule being located within each of said vertical and horizontal windows and having end portions thereof supported by said spirit level tube mounts;

at least one of said side flanges having an inspection window therein permitting visual inspection of at least one of said spirit level tube capsules;

a protractor mount being provided by said central web;

a protractor capsule being rotatably supported by said protractor mount and being rotatably adjustable; and a spirit level tube being supported within said protractor capsule and having a liquid therein defining a spirit bubble, said spirit level tube having level indicating indicia thereon, said spirit bubble being disposed in registry with said indicia when one of said side flanges is disposed in alignment with a selected angle of said protractor capsule.

17. The omnidirectional torpedo level of claim 13, comprising:

said torpedo level body having a central web and having side flanges integral with said central web, said side flanges defining at least a part of said reference surface portions;

said omnidirectional mount enlargement being integral with said upper end of said central web and having a generally circular upper end surface oriented in substantially normal relation with said longitudinal body axis, said omnidirectional mount enlargement defining an upwardly facing circular receptacle; and an omnidirectional level capsule being located within said upwardly facing circular receptacle and being of generally cylindrical configuration and positioning said transparent lens within said circular receptacle.

18. The omnidirectional torpedo level of claim 13, comprising:

said side flanges of said torpedo level body defining front and rear surfaces, said rear surfaces being reference surfaces disposed in parallel relation and defining said imaginary reference plane; and said omnidirectional level mount enlargement being of generally conical configuration and having an annular upper end thereof defining a substantially planar surface and defining a rear portion thereof projecting toward said imaginary plane.

19. The omnidirectional torpedo level of claim 13, comprising:

said level body being composed of non-ferrous material; and a plurality of level support magnets being mounted to said level body and supporting said level on ferrous metal objects.

* * * * *